UNITED STATES PATENT OFFICE.

ARTHUR WEINBERG, OF FRANKFORT-ON-THE-MAIN, GERMANY, ASSIGNOR TO LEOPOLD CASSELLA & CO., OF FRANKFORT-ON-THE-MAIN, GERMANY.

BROWN-VIOLET SULFUR DYE AND PROCESS OF MAKING SAME.

SPECIFICATION forming part of Letters Patent No. 701,435, dated June 3, 1902.

Application filed January 5, 1901. Renewed January 13, 1902. Serial No. 89,592. (No specimens.)

*To all whom it may concern:*

Be it known that I, ARTHUR WEINBERG, a citizen of Prussia, and a resident of Frankfort-on-the-Main, in the Province of Hesse-Nassau and Kingdom of Prussia, Germany, have invented certain new and useful Improvements in Brownish-Violet Coloring-Matter and Processes of Making Same, of which the following is a specification.

I have found that by heating oxyderivatives of bodies which contain an azin group with alkaline sulfids and sulfur valuable dyestuffs are obtained which from a bath containing sodium sulfid produce on cotton shades varying from violet to brown. It is advantageous, though not absolutely necessary, if also amido groups are present besides one or more hydroxyl groups. The amidoöxyphenazin (Nietzki, *Berichte d. d. Chem. Ges.*, XXVIII, 2975) of the formula

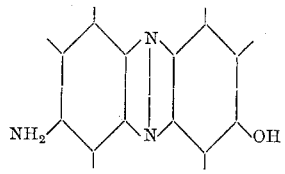

may be considered a typical starting material. It yields a brownish-violet dyestuff. The same dyestuff is obtained if a sulfo group, a carboxyl group, or a halogen atom is substituted in this compound. For instance, the amidoöxyphenazincarbonic acid

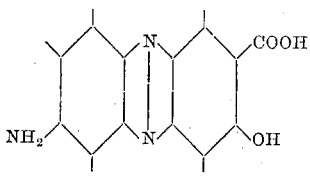

(which is obtained by the condensation of dinitrochlorbenzene with para amido salicylic acid, reducing this compound, and oxidizing with manganperoxid) yields substantially the same brownish-violet color.

In carrying out my invention I proceed, for instance, as follows: Ten kilos amidoöxyphenazin are gradually introduced into a mixture of fifty kilos crystallized sodium sulfid, twenty kilos sulfur, and ten liters water and heated to 90° to 100° centigrade. The temperature is then slowly raised to 140° to 150° centigrade and heating continued until the melt dissolves completely in water with a black-violet shade and until a test of the solution does not show a yellow border on filtering-paper. The melt is then dried completely, and the thus-obtained crude dyestuff may serve directly for dyeing purposes, or it is precipitated from the solution by neutralizing with an acid, filtered off, and dried. For dyeing purposes it must then be dissolved by means of sulfid of sodium. The thus-produced dyestuff shows the following reactions: It dissolves in concentrated sulfuric acid with a violet-black color and separates from this solution in the form of a violet precipitate by addition of water. It is soluble in caustic alkalies with a brown color, very easily soluble in water in the presence of alkaline sulfids with a violet-black color. It dyes unmordanted cotton brownish-violet shades which are fast to washing, alkalies, acids, and light.

Having thus described my invention and how it may be carried out, what I claim is—

1. The process of producing a brownish-violet dyestuff by heating oxyamidophenazin of the formula

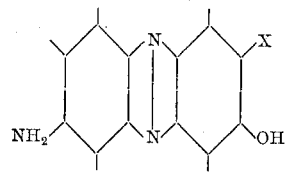

(in which $x$ stands for hydrogen, chlorin, a sulfo group or a carboxyl group) with alkaline sulfids and sulfur substantially as described.

2. The coloring-matter produced as hereinbefore described which is a dark-violet or black powder, dissolving in concentrated sulfuric acid with a violet-black color being precipitated from this solution by addition of water, easily soluble in water in presence of alkaline sulfids, dyeing unmordanted cotton brownish-violet shades fast to washing, alkalies, acids and light substantially as described.

Signed at Frankfort-on-the-Main, in the Province of Hesse-Nassau and Kingdom of Prussia, this 18th day of December, A. D. 1900.

ARTHUR WEINBERG.

Witnesses:
JEAN GRUND,
CARL GRUND.